(12) United States Patent
Su

(10) Patent No.: US 6,272,322 B1
(45) Date of Patent: Aug. 7, 2001

(54) REAL-TIME TRANSCEIVER GAIN AND PATH LOSS CALIBRATION FOR WIRELESS SYSTEMS

(75) Inventor: David Su, Mountain View, CA (US)

(73) Assignee: Atheros Communications, Inc., Palo Alto, CA (US)

(*) Notice: Subject to any disclaimer, the term of this patent is extended or adjusted under 35 U.S.C. 154(b) by 0 days.

(21) Appl. No.: 09/498,400

(22) Filed: Feb. 4, 2000

(51) Int. Cl.[7] .................................................. H04B 17/00
(52) U.S. Cl. .......................................... 455/67.1; 455/67.6
(58) Field of Search ................................. 455/67.1, 67.4, 455/67.6, 552, 69; 379/22.01

(56) References Cited

U.S. PATENT DOCUMENTS

| | | | |
|---|---|---|---|
| 4,384,367 | * 5/1983 | King et al. ............................ | 455/325 |
| 5,056,109 | * 10/1991 | Gilhousen et al. ...................... | 375/1 |
| 5,265,119 | * 11/1993 | Gilhousen et al. ...................... | 375/1 |

* cited by examiner

Primary Examiner—Vivian Chang
Assistant Examiner—N Mehrpour
(74) Attorney, Agent, or Firm—Blakely, Sokoloff, Taylor & Zafman LLP

(57) ABSTRACT

A calibration method and apparatus are described. In one embodiment, the method includes a pair of transceivers performing a loop back test to determine a relationship between transmit and receive gain for each transceiver. A path loss between the first transceiver and a second transceiver is computed. The computation is made by transmitting a pair of signals in opposite directions between the first and second transceivers to determine a relationship between transmit path gain of the first transceiver and receive path gain of the second transceiver and a relationship between the transmit path gain of the second transceiver and receive path of the first transceiver. The transmit and receive path gains are generated for the first transceivers based on the path loss and the relationship.

21 Claims, 5 Drawing Sheets

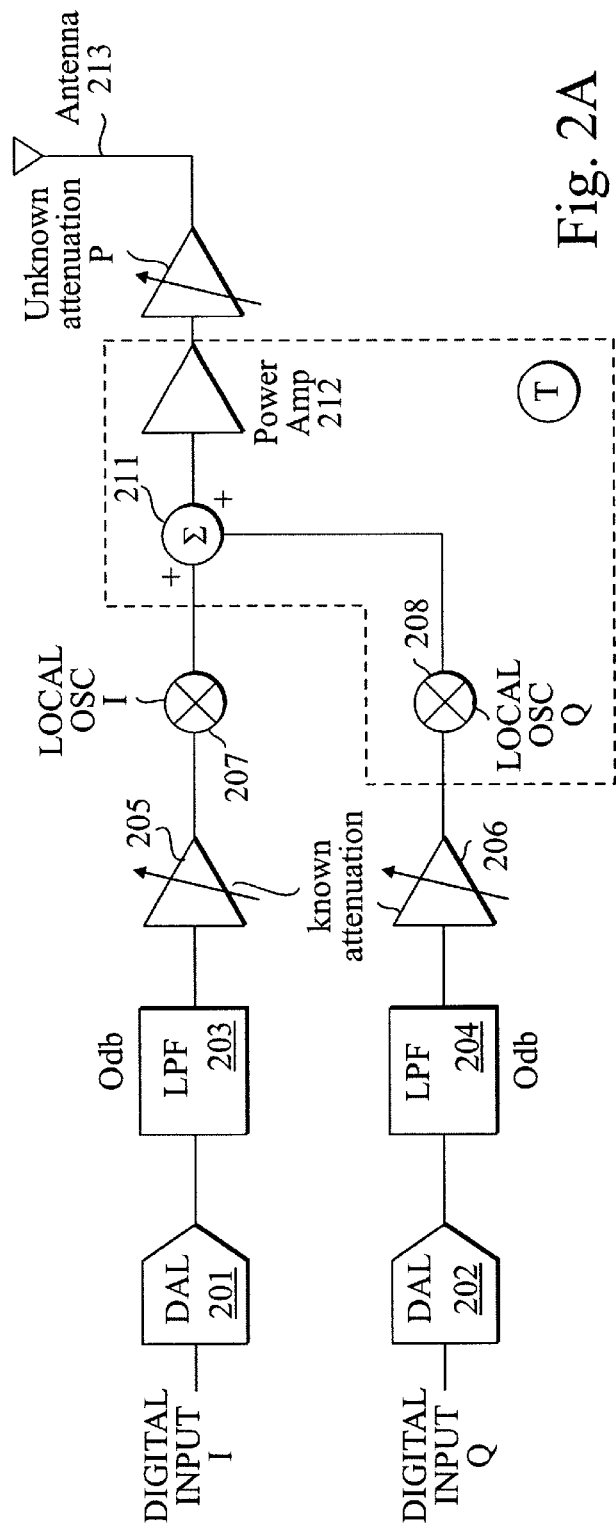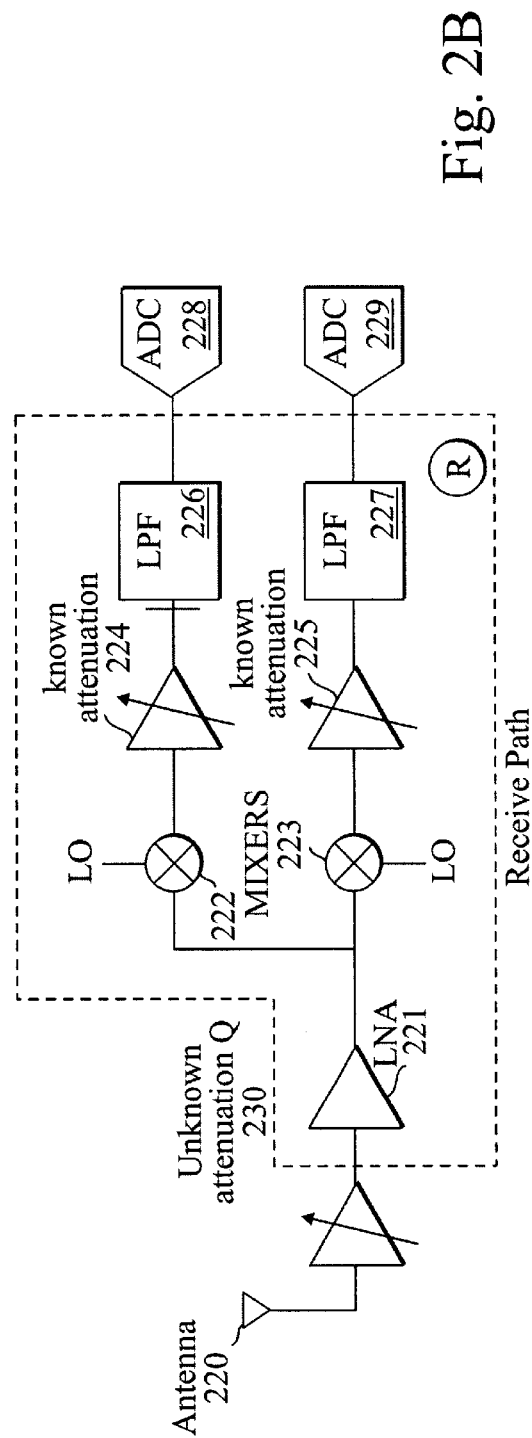
Fig. 2A
Fig. 2B

REAL-TIME TRANSCEIVER GAIN AND PATH LOSS CALIBRATION FOR WIRELESS SYSTEMS

FIELD OF THE INVENTION

The present invention relates to wireless systems. More specifically, the present invention relates to a novel and improved method and apparatus for controlling transmitter power in a code division multiple access (CDMA) or other wireless systems.

BACKGROUND OF THE INVENTION

The use of wireless communication is becoming more widespread. As the number of mobile units in the system increases, techniques are often used to improve communication. The use of code division multiple access (CDMA) modulation techniques is one of several techniques for facilitating communications in which a large number of system users are present.

In a typical wireless communication system, the mobile units used for communication typically include transceiver capable of transmitting and receiving messages. In most transceivers, the absolute values of the gain of transmit and receive paths are not precisely known without some form of calibration. In wireless systems that require well-controlled output power levels, some form of closed-loop power control scheme can be employed.

To calibrate a mobile unit in satellite-based CDMA communications systems, the mobile unit transceiver measures the power level of a signal received via a satellite repeater. Using this power measurement, along with knowledge of the satellite transponder downlink, the transmit power level, and the sensitivity of the mobile unit receiver, the mobile unit transceiver can estimate the path loss of the channel between the mobile unit and the satellite. The mobile unit transceiver then determines the appropriate transmitter power to be used for signal transmissions between the mobile unit and the satellite, taking into account the path loss measurement, the transmitted data rate, and the satellite receiver sensitivity.

The signals transmitted by the mobile unit to the satellite are relayed by the satellite to a Hub control system earth station. The Hub measures the received signal power from signals transmitted by each active mobile unit transceiver. The Hub then determines the deviation in the received power level from that which is necessary to maintain the desired communications. Preferably the desired power level is a minimum power level necessary to maintain quality communications so as to result in a reduction in system interference. After determining the deviation in received power, the Hub transmits a power control command signal to each mobile user so as to adjust or "fine tune" the transmit power of the mobile unit. This command signal is used by the mobile unit to change the transmit power level closer to a minimum level required to maintain the desired communications. As channel conditions change, typically due to motion of the mobile unit, both the mobile unit receiver power measurement and the power control feedback from the Hub continually readjust the transmit power level so as to maintain a proper power level. The power control feedback from the Hub is generally quite slow due to round trip delays through the satellite requiring approximately ½ of a second of propagation time.

In contrast to the satellite-based wireless system, in a terrestrial-based wireless system, calibration must take into account the fact that the distance between the mobile units and the cell sites can vary considerably. For example, one mobile unit may be located at a distance of five miles from the cell site while another mobile unit may be located only a few feet away. The variation in distance may exceed a factor of one hundred to one. The terrestrial channel in such a wireless system experiences a propagation loss characteristic (as did the satellite channel), but in the terrestrial channel the propagation loss characteristic corresponds to an inverse fourth-power law, i.e., the path loss is proportional to the inverse of the path distance raised to the fourth power. Accordingly, path loss variations may be encountered which are on the order of over 80 dB in a cell having a radius of five miles.

U.S. Pat. No. 5,257,283, to Gilhousen et al. proposed one method of calibrating mobile units in a terrestrial-based wireless system. Specifically, Gilhousen discloses a closed-loop power control scheme in which the base station indicates to the transmitter that the transmitter is transmitting at too high a power level or too low a power level based on signals the base station receives. The transmitter is then responsible for adjusting its power level to conform to the demands of the base station. One problem with this approach is that it requires a central controller to make a determination as to whether the power level is too high or low.

If the transmitter gain, receiver gain, and path loss are known, each transmitter can adjust its output power level to the determined power level without employing closed-loop control. The transmitter gain and receiver gain can potentially be calibrated off-line. However, such off-line calibration is sensitive to device aging and temperature drift.

What is needed is a calibration methodology that overcomes deficiencies in the prior art.

SUMMARY OF THE INVENTION

A calibration method and apparatus are described. In one embodiment, the method includes a pair of transceivers performing a loop back test to determine a relationship between transmit and receive gain for each transceiver. A path loss between the first transceiver and a second transceiver is computed. The computation is made by transmitting a pair of signals in opposite directions between the first and second transceivers to determine a relationship between transmit path gain of the first transceiver and receive path gain of the second transceiver and a relationship between the transmit path gain of the second transceiver and receive path of the first transceiver. The transmit and receive path gains are generated for the first transceivers based on the path loss and the relationship.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIGS. 2A and 2B are block diagrams of exemplary transmit and receive paths for each node in the network of FIG. 1.

DETAILED DESCRIPTION OF THE PRESENT INVENTION

Figure 1:
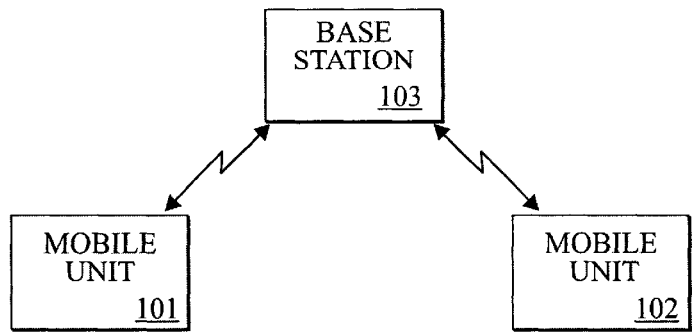
FIG. 1 illustrates an exemplary network with two mobile nodes and a base station.

A method and apparatus for gain and path loss calibration for wireless systems are described. In the following description, numerous details are set forth, such as frequencies, power levels, gains, etc. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Overview

A method and apparatus for determining transmit and receive gain of a wireless transceiver as well as the path loss between multiple (e.g., two or more) transceivers. The technique described herein allows the transmitter gain, receiver gain, and path loss to be determined in real-time in a closed-loop control scheme with each transmitter in the wireless system adjusting its output power level to a predetermined power level. In one embodiment, the real-time gain and path loss calibration scheme can determine the gain and path loss of a wireless system during network establishment and at periodic intervals during regular operation.

In CDMA wireless systems, multiple mobile users may transmit simultaneously to the same receiver (e.g., a base station). It is highly desirable to have each mobile user adjust its transmit power in inverse relation to the path loss to the base station. Maximum capacity is achieved if the power received by the base station from each mobile user is the same. In one embodiment, in order for the calibration scheme to obtain better performance, the system has at least two wireless nodes (for example, one base station and two mobile users).

FIG. 1 illustrates a wireless system having three nodes. Each of the nodes may be a basestation or a mobile user. In one embodiment, the wireless system mobile units 101 and 102 comprise mobile radios, cellular telephones, wireless local area networks, etc.

FIGS. 2A and 2B illustrate exemplary embodiments of transmit and receive paths, respectively, for each of mobile devices 101 and 102. FIGS. 2A and 2B represent a implementation that uses a direct up conversion technique (zero IF). Note that other implementations may be used, such as, for example, a super heterodyne architecture.

Referring to FIG. 2A, digital-to-analog converters 201 and 202 generate analog signals that are coupled to inputs of low pass filters (LPFs) 203 and 204 respectively. In one embodiment, LPFs 203 and 204 comprises 0 db filters. The output signals from LPFs 203 and 204 are attenuated with known attenuations 205 and 206 respectively. The known attenuations 205 and 206 may comprise a gain and control block that is used to adjust the gain by a predetermined amount, such as, for example, from 0–15 db. If attentuation 205 is earlier in the transmit path than the transmit gain, then the gain/attenuation may be obtained using, for example, a current mirror or resistor network. If attenuator 205 (or 206) is after the transmit gain, an RF coupler may be used to obtain the desired gain/attenuation.

The attenuated signals are input to mixers 207 and 208, which mixes these signals with a local oscillators 209 and 210 respectively. The outputs of mixers 207 and 208 are input to combiner 211 that adds the outputs together. The combined signal is coupled to an input of power amplifier 212. The output of power amplifier 212 is transmitted via antenna 213. Prior to calibration, the transmit path has an unknown attenuation with which it is associated.

Referring to FIG. 2B, antenna 220 in the receive path, which has an unknown gain/attenuation 230 prior to calibration, receives a signal and provides the signal to a low noise amplifier (LNA) 221 to which it is coupled. The unknown gain/attenuation may be associated with LNA 221.

LNA 221 amplifies the received signal and provides it to mixers 222 and 223, which mixes the received signal with a local oscillator. The outputs of mixers 222 and 223 are provided to 204 are attenuated with known attenuations 224 and 225, respectively. The attenuated signals from attenuations 224 and 225 are coupled to inputs of filters 226 and 227, respectively. The outputs of filters 226 and 227 are coupled to inputs of analog-to-digital converters (ADCs) 228 and 229, respectively.

Figure 3:
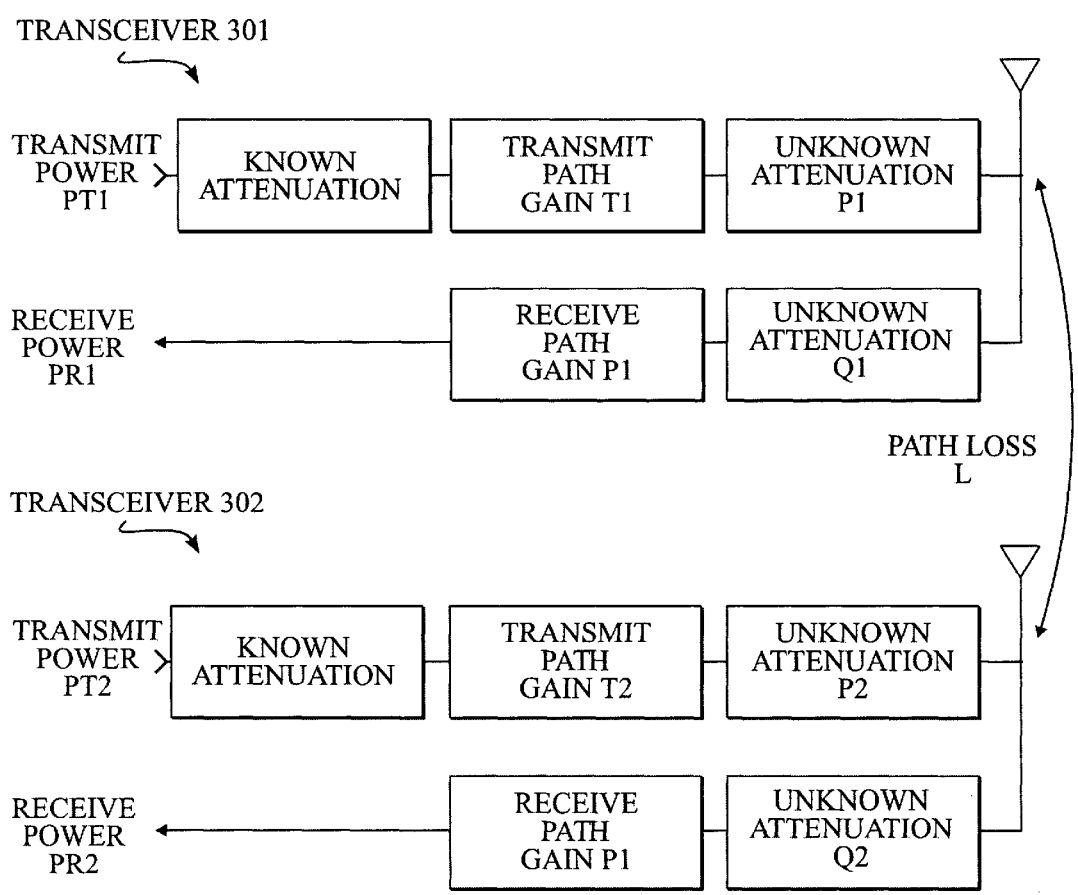
FIG. 3 illustrates models of the transceivers in FIGS. 1 and 2.

FIG. 3 illustrates models of mobile units in FIGS. 1 and 2. Referring to FIG. 3, Pt1 and Pt2 represent the transmitted power at the output of the DACs of transceivers 301 and 302 respectively. The absolute values of the transmitted powers Pt1 and Pt2 at the outputs of the two transceivers 301 and 301, respectively, are known. Pr1 and Pr2 represent the received power at the input of the ADCs of transceivers 301 and 302, respectively. The absolute values of the received powers Pr1 and Pr2 at the outputs of the two transceivers 301 and 302, respectively, are known. T1 and R1 represent transmit and receive path gains of transceiver 301, which are not known. T2 and R2 represent transmit and receive path gains of transceiver 302, which are not known. The path loss, represented as L, from transceiver 301 to transceiver 302 is assumed to be the same as the path loss from transceiver 302 to transceiver 301. P1 and Q1 are two unknown step attenuators for transceiver 301. P2 and Q2 are two unknown step attenuators for transceiver 302. Each path may include more than one unknown attenuation.

Figure 4:
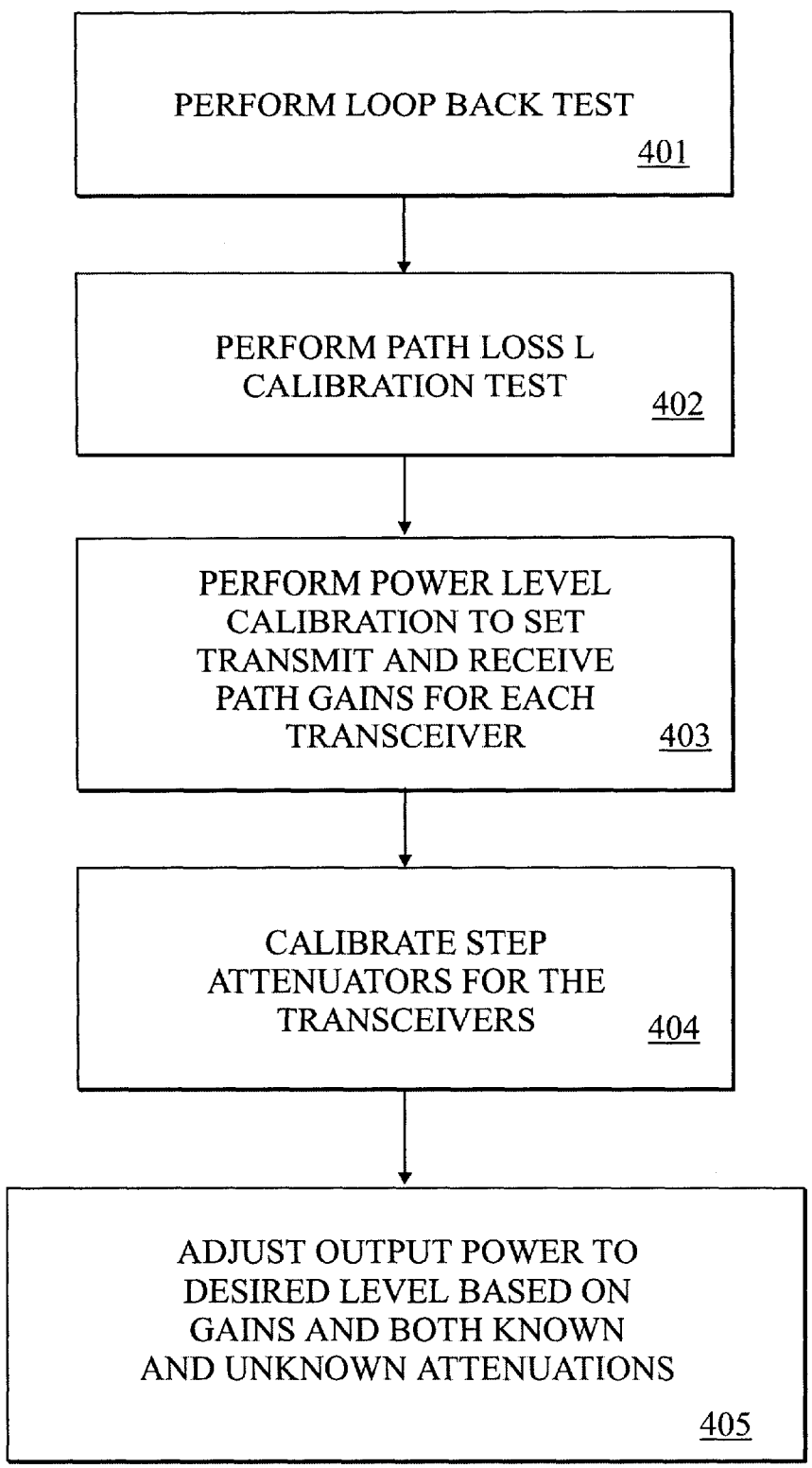
FIG. 4 is a flow diagram of one embodiment of a process for performing gain and power level calibration in a wireless system.

FIG. 4 is a flow diagram of one embodiment of a process for calibrating gain and path loss for a transceiver. The process is performed by processing logic that may comprises hardware, software or a combination of both.

Referring to FIG. 4, the process begins by processing logic performing a loop back test for each transceiver to determine the path loss (processing block 401). In one embodiment, the loop back test comprises each transceiver transmitting an signal at a known power and receiving the signal at the receiver at a known power. For example, transceiver 301 transmits an signal with its transceiver at power Pt1 and receives the signal at its receiver at power Pr1. The same loop back test is performed with transceiver 302.

In one embodiment, the transmitter described herein has adequate well-controlled power control range in the baseband before the RF path so that the loop back test may be performed without overloading the receiver. A~25 dB attenuation may be needed.

In order to avoid overloading the receiver, a known attenuation of a predetermined amount may be inserted in the transmit path. In one embodiment, the attenuation is inserted prior to the transmit gain T1 via, for example, a current mirror, a closed-loop amplifier, etc. In one embodiment, the known attenuation may provide up to 30 dB of attenuation.

During the loop back test, the step attenuators P1, Q1, P2, Q2 are not activated, and the received power Pr1x of transceiver 301 and the received power Pr2x of transceiver 302 are given by the following equations:

$$Pr1x = Pt1x + T1 + R1 \quad (1)$$

$$Pr2x = Pt2x + T2 + R1 \quad (2)$$

where the transmit powers Pt1x and Pt2x and receive powers Pr1x and Pr2x are known quantities and the transmit gains T1 and T2 and receive gains R1 and R2 are unknowns.

After performing the loop back test for each transceiver, processing logic performs a path loss calibration test (processing block 402). In one embodiment, during the path loss calibration test, each transceiver transmits a signal to be received by the other transceiver. For example, transceiver 301 transmits a signal to be received by transceiver 302. During the transmission, the step attenuators P1, Q1, P2, Q2 are not activated. In order to avoid overloading the other receiver, the transmitted power may need to be attenuated by a known fixed amount. Such attenuation may be achieved by placing an attenuator before each of the transmit gains T1 and T2. The received power at the input of the ADCs of transceivers 301 and 301 is given by the following equations:

$$Pr1y = Pt2y + T2 - L + R1 \quad (3)$$

$$Pr2y = Pt1y + T1 - L + R2 \quad (4)$$

With the transmit and receive powers being known, equations (1)–(4) above may be rewritten as follows:

$$T1 + R1 = C1 \quad (5)$$

$$T2 + R2 = C2 \quad (6)$$

$$T2 + R1 - L = C3 \quad (7)$$

$$T1 + R2 - L = C4 \quad (8)$$

where C1, C2, C3, C4 are known constants.

Adding equations (7) and (8) results in the following:

$$(T2 + R1 - L) + (T1 + R2 - L) = C3 + C4 \quad (9)$$

$$T1 + R1 + T2 + R2 - 2L) = C3 + C4 \quad (10)$$

Substituting (5) and (6) into equation 10 results in the following equation:

$$C1 + C2 - 2L = C3 + C4 \quad (10)$$

or, rewritten with respect to the path loss L, $$L = (C1 + C2 - C3 - C4)/2 \quad (12)$$

Therefore, processing logic determines the path loss L using equation (12).

Once the path loss L has been determined, processing logic performs power level calibration to set the absolute value for transmit path gain T1 and receive path gain R1 for transceiver 301 and the transmit path gain T2 and receive path gain R2 for transceiver 302 (processing block 403).

In one embodiment, one of the transceivers, such as a base station, has the ability to generate a very precise output power. That is, in one embodiment, the power amplifier of one of the transceivers, such as the base station transmitter, has a closed-loop mechanism that allows establishing a maximum output power of 50 mW at the antenna. In one embodiment, a feedback loop in the transmitter ensures the accuracy of the output power being generated. For example, if a sine wave signal is used for the calibration of the power level at maximum output power, a large baseband sine wave can be input and the feedback loop sets the output power level. In other words, the feedback loop ensures that if the digital code at the input of the transmitter is a large sine wave, the output of the power amplifier saturates to a constant amplitude sine wave of 50 mW in power.

By knowing the absolute value of the power transmitted, the received power at the other transceiver can be measured according to the following equation:

$$Pr2 = 17\text{ dBm} - L + R2.$$

Using the transmit power (17 dBm (50 mW) in this case), the path loss and the measured received power, processing logic computes the receive path gain R2. Therefore, for the example of using a transmit power of 17 dbm, and rewriting equation (12), processing logic calculates R2 according to the following equation:

$$R2 = Pr2 - 17\text{ dBm} + \frac{(C1 + C2 + C3 - C4)}{2} \quad (14)$$

Once R2 has been computed, processing logic generates the transmit path gain T1 and receive path gain R1 for transceiver 301 and the transmit path gain T2 for transceiver 302 by substituting the values of R2 and L into equations (5)–(8) above. For example, when using a transmit power of 50 mW, equations (6) and (8) may be rewritten using equation (14) as follows:

$$T2 = C2 - Pr2 + 17\text{ dBm} - \frac{(C1 + C2 + C3 - C4)}{2} \quad (15)$$

$$T1 = C4 + \frac{(C1 + C2 + C3 - C4)}{2} - Pr2 + 17\text{ dBm} - \quad (16)$$
$$\frac{(C1 + C2 + C3 - C4)}{2}$$
$$= C4 - Pr2 + 17\text{ dbm}$$
$$R1 = C1 - C4 - Pr2 + 17\text{ dBm}$$

In this manner, each of the transmit and receive gains could be determined by processing logic.

In one embodiment in which there are no step attenuators, the process would be finished, as the transmit and receive gains for each transceiver have been calculated.

However, in embodiments with step attenuators, after the transmit path and receive path gains for transceivers 301 and 302 have been determined, processing logic calibrates the step attenuators for the transceivers (processing block 404).

In one embodiment, both transmit and receive paths have a fixed step attenuators P1, Q1, P2 and Q2. These steps may be large (in the order of ~25 dB) but less than the baseband attenuation used to prevent overloading of the receiver so that an overall of approximately 50 dB attenuation may be obtained.

In one embodiment, processing logic calibrates the step attenuators P1 and Q1 for transceiver 301 and the step attenuators P2 and Q2 for transceiver 302. This may be performed by each transceiver individually. For example, transceiver 301 can repeat its loop back test with the step attenuator P1 activated. The transmit power Pt1 may need to be larger than discussed above to allow for accurate reception of the received power level. The received power may be given by the following equation:

$$Pr1 = Pt1 + T1 - P1 + R2$$

Using known values for Pr1, Pt1, T1 and R2, processing logic derives the step attenuator P1.

In a similar manner, processing logic derives the step attenuator Q1 by deactivating step attenuator P1 and activating step attenuator Q1. Thus, the step attenuators P1 and Q1 for transceiver 301 are generated by processing logic. The same technique may be used to determine step attenuators P2 and Q2 for transceiver 302.

Once the transmit gain and the receive gain for each mobile unit has been determined, as well as the path loss to the base station, processing logic in each mobile unit adjusts the mobile unit's output power level so as to provide a desired power at the receiver of the base station (processing block 405). For example, the information about transmit path gain T1 and step attenuator P1 allow for accurately setting the transmit power level Pt1 to avoid clipping the output.

The above calibration scheme assumes that the mobile users are essentially stationary for the entire duration of the calibration cycle (which can be relatively short in time). After calibration, the mobile users will continuously sense the receive power from the base station. If the receive power should vary when the base station did not change its transmit power level, the mobile device determines that the path loss may have changed. Based on this information, the mobile unit adjusts its transmit power to compensate for the variation in the path loss.

Additional Nodes Joining the Network

Figure 5:
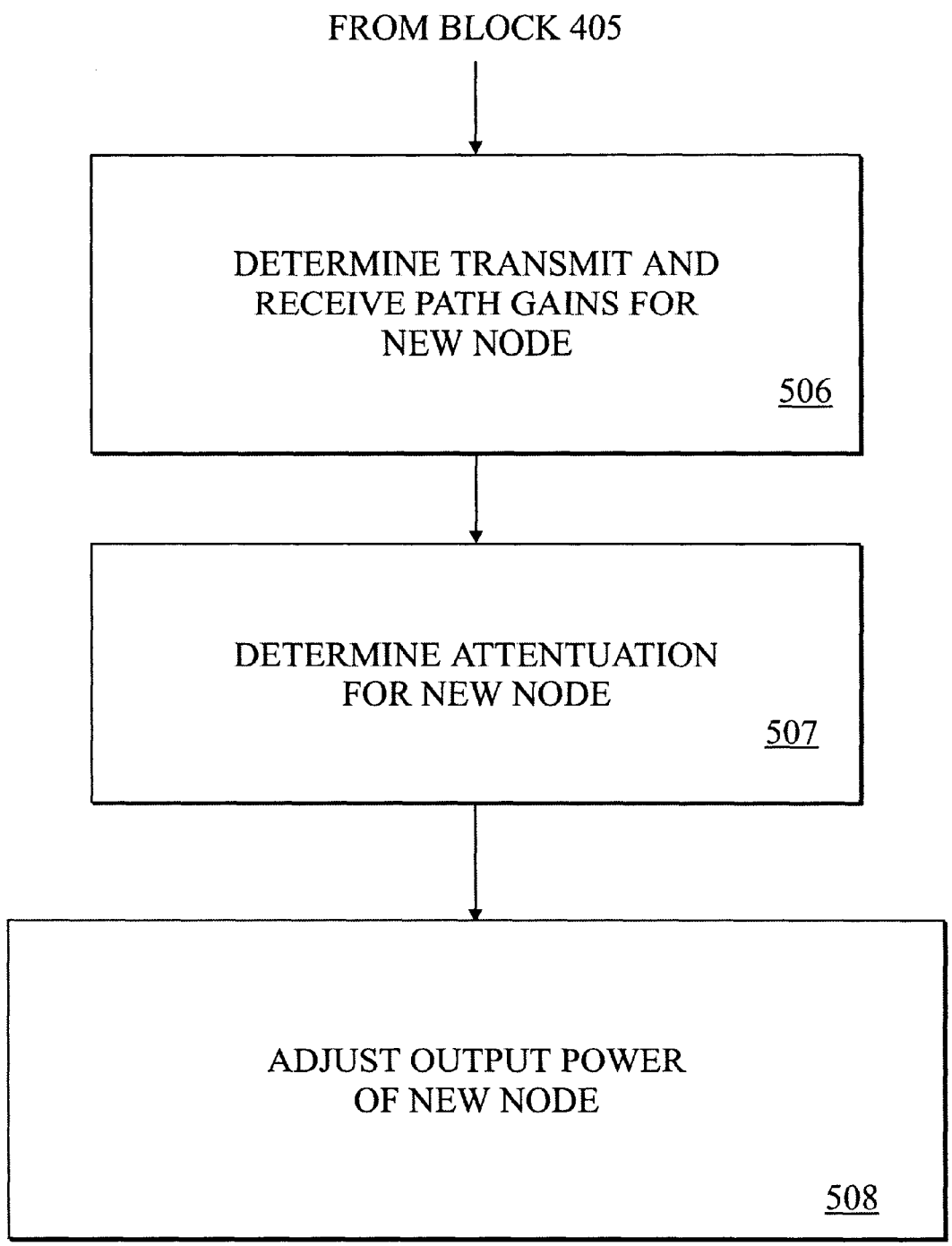
FIG. 5 is a flow diagram of an alternative embodiment of a process for performing gain and power level calibration in a wireless system.

Whenever an additional node joins the network, the base station can coordinate an abbreviated calibration cycle with the new node and determine the new node's transmit gain, receive gain and path loss since the base station (or other transceiver) knows its own transmit and receive gains. One embodiment of the process by which the gain and path loss are calibrated for the additional node joining the network is shown in FIG. 5. The process is performed by processing logic, which may comprise hardware, software or a combination of both.

Referring to FIG. 5, processing logic initially causes the new node to transmit a low power to its own receiver. The process is the same as FIG. 4, with the exception of the addition of processing blocks 506 and 507 in which processing logic determines the transmit path gain T3 and the receive path gain R3 for the new node as well as the attenuation A13 between the new node and the base station.

The receive power of the new node may be represented according to the following equation:

$$Pr3 = Pt3 + T3 + R3.$$

The transmit power of the base station is known to the node. This equation may be rewritten above as $$T3 + R3 = C1$$

where C1 is known.

The base station transmits a signal that the new node receives. The received power Pr3x of the signal from the base station may be represented as follows:

$$Pr3x = Pt1x + T1 - A13 + R3.$$

This equation may be rewritten above as $$R3 - A13 = C2$$

where C2 is known.

Similarly, the new node transmits a signal that the base station receives. The received power Pr1y of the signal at the base station may be represented as follows:

$$Pr1y = Pr3y + T3 - A13 + R1.$$

The known power levels need to be shared by the base station and mobile units. The quantities Pr1y, Pr3y etc. are sent from one unit to the other so that the appropriate computation can be done. The computation of the equations can be done in one unit (such as the base station) and then shared with other units. Alternatively, all units can do their own computation after sharing the information such as Pr . . . Pt . . . etc.

This equation may be rewritten above as $$T3-A13=C3$$

where C3 is known. Adding the last two equalities together gives $$T3+R3-2A13=C2+C3,$$

which may be reduced to $$C1-2A13=C2+C3$$

because T3+R3=C1.

$$T3 = C3 - \frac{(C1-C2-C3-C4)}{2} \text{ and}$$
$$R3 = C2 - \frac{(C1-C2-C3-C4)}{2}.$$

Using the three equalities, processing logic determines transmit path gain T3 and receive path gain R3, along with the attenuation A13. The equation in A13 may be rewritten as the following:

$$A13 = \frac{(C1-C2-C3-C4)}{2}.$$

Therefore, the processing logic generates these values and, then using those values, makes adjustments to the transmit power.

An Exemplary Transceiver

Figure 6:
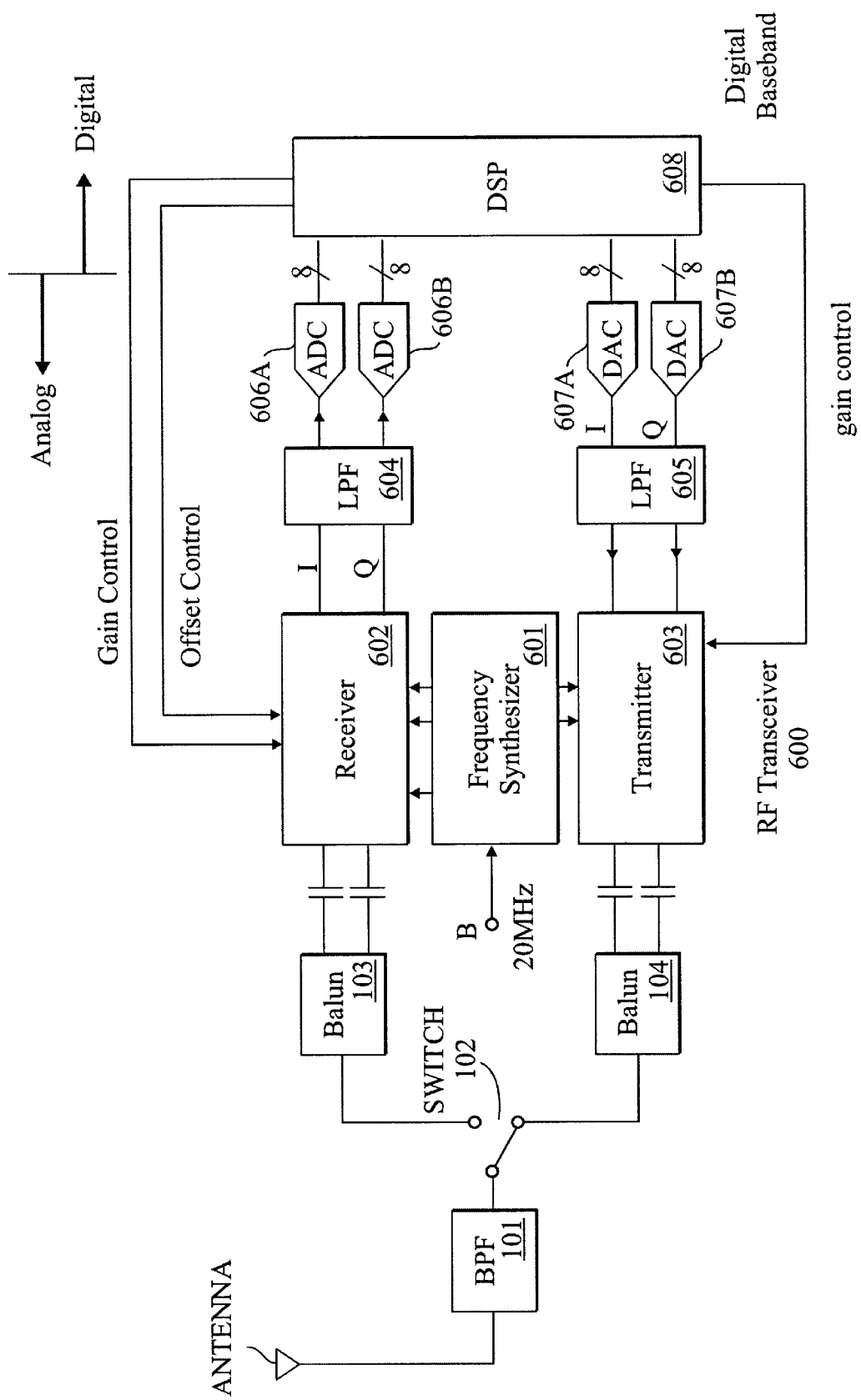
FIG. 6 is a block diagram of one embodiment of a transceiver.

One embodiment of a radio that includes the RF front-end described above is shown in FIG. 6. Referring to FIG. 6, the radio contains a front-end 600 having receiver 602, transmitter 603, and frequency synthesizer 601. Frequency synthesizer 601 supplies clock signals to receiver 602 and transmitter 603 using a 20 MHz input signal. For more information on front-end 600, see U.S. patent application Ser. No. 09/483,948, entitled "An RF Front-End with a Multistage Stepdown Filtering Architecture," filed Jan. 13, 2000, and assigned to the corporate assignee of the present invention.

The I and Q signals of the receive path of the front-end are coupled to a low pass filter (LPF) 604, which filters signals at frequencies above a predetermined frequency (set based on the design). The filtered signals are converted to digital using analog-to-digital converters (ADCs) 606A and 606B. The digital signals are input to digital signal processor (DSP) 608.

The I and Q signals input to transmitter 603 of the transmit path of the front-end are received from LPF 605, which filters I and Q signals from digital-to-analog converters (DACs) 607A and 607B. DACs 607A and 607B receive signals from DSP 608.

DSP 608 performs the processing associated with modulation and demodulation signals. In one embodiment, DSP 608 also generates gain, power level, and offset control signals that are sent to the RF front end to control the front end. The gain and power level control signals control the gains of both the receive and transmit paths as well as the transmitter power level based on the results of the calibration described above.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

Thus, a calibration technique has been described.

I claim:

1. A calibration method comprising:

a pair of transceivers performing a loop back test to determine a relationship between transmit and receive gain for each transceiver;

computing a path loss between a first transceiver and a second transceiver, wherein computing the path loss comprises transmitting a pair of signals in opposite directions between the first and second transceivers to determine a relationship between transmit path gain of the first transceiver and receive path gain of the second transceiver and a relationship between the transmit path gain of the second transceiver and receive path gain of the first transceiver; and generating transmit and receive path gains for the first transceivers based on the path loss and the relationships.

2. The method defined in claim 1 wherein performing the loop back test comprises using an attenuation in a transmit path of the first transceiver.

3. The method defined in claim 1 wherein the loop back test comprises de-activating any step attenuators in transmit and received paths of the first transceiver.

4. The method defined in claim 1 wherein generating the transmit and receive path gains for the first transceiver comprises performing power level calibration using a fixed power level.

5. The method defined in claim 1 further comprising calibrating step attenuators in the first and second transceivers.

6. The method defined in claim 5 wherein calibrating step attenuators comprises performing a loop back test while activating each step attenuator for each transceiver transmit or receive path when only activating said each step attenuator during the loop back test.

7. The method defined in claim 1 further comprising adjusting an output power level for each transmitter based on its path loss and its transmit path and receive path gains.

8. The method defined in claim 1 further comprising adding a third transceiver mode comprising:

(a) the third transceiver performing a loop back test;

(b) a base station transmitting a signal to the third transceiver;

(c) the third transceiver transmitting a signal to the base station;

(d) determining transmit and receive path gains and third transceiver attenuation based on results of (a)–(c).

9. A calibration method using a plurality of mobile unit that each have a transceiver, the method comprising:

each transceiver performing a loop back test to determine relationships between transmitter and receiver power levels of each transceiver;

computing path loss between a pair of transceivers, wherein computing path loss includes each transceiver transmitting a signal to another transceiver;

determining the receive path gain for each transceiver based on the computed path loss and the power level of a signal received by said each transceiver and transmitted by another transceiver using a predetermined transmit power level; and determining the transmit path gains and another receive path gain based on the first receive path gain.

10. The method defined in claim 9 wherein calibrating step attenuators for the transceivers by performing a loop back test for each step attenuator in during which only said each step attenuator is active.

11. The method defined in claim 9 wherein adjusting an output power level for each transmitter based on its path loss and its transmit and receive gains.

12. The method defined in claim 9 further comprising adding a third transceiver mode comprising:
(e) the third transceiver performing a loop back test;
(f) a base station transmitting a signal to the third transceiver;
(g) the third transceiver transmitting a signal to the base station;
(h) determining transmit and receive path gains and third transceiver attenuation based on results of (a)–(c).

13. An apparatus comprising:
means in each of a pair of transceivers for performing a loop back text to determine a relationship between transmit and receive gain for each transceiver; and
means for computing a path loss between the first transceiver and a second transceiver by transmitting a pair of signals in opposite directions between the first and second transceivers to determine a relationship between transmit path gain of the first transceiver and receive path gain of the second transceiver and a relationship between the transmit path gain of the second transceiver and receive path of the first transceiver; and
means for generating transmit and receive path gains for the first transceivers based on the path loss and the relationships.

14. The apparatus defined in claim 13 wherein the means for performing the loop back test comprise means for providing attenuation in a transmit path of the first transceiver.

15. The apparatus defined in claim 13 wherein the means for performing loop back test comprises means for de-activating any step attenuators in transmit and received paths of the first transceiver.

16. The apparatus defined in claim 13 wherein the means for generating the transmit and receive path gains for the first transceiver comprises means for performing power level calculation.

17. The apparatus defined in claim 13 further comprising means for calibrating step attenuators in the first and second transceivers.

18. The apparatus defined in claim 17 wherein means for calibrating step attenuators comprises means for performing a loop back test for each step attenuator for each transceiver transmit or receive path when only activating said each step attenuator during the loop back test.

19. The apparatus defined in claim 13 further comprising means for adjusting an output power level for each transmitter based on its path loss and its transmit and receive gains.

20. The apparatus defined in claim 13 further comprising means for adding a third transceiver mode comprising:
means for performing a loop back test in the third transceiver;
means for receiving a signal form a base station;
means for transmitting a signal to the base station;
means for determining transmit and receive path gains and third transceiver attenuation based on the results.

21. A mobile device having a first transceiver the device comprising:
an Rf front end;
a processing unit coupled to the RF front end, the processing circuit performing gain and power level calibration by:
performing a loop back test to determine a relationship between transmit and receive gain for each transceiver; and
computing a path loss between the first transceiver and a second transceiver, wherein computing the loss comprises transmitting a pair of signals in opposite directions between the first and second transceivers to determine a relationship between transmit path gain of the first transceiver and receive path gain of the second transceiver and a relationship between the transmit path gain of the second transceiver and receive path of the first transceiver; and
generating transmit and receive path gains for the first transceivers based on the path loss and the relationship using a fixed power level.

* * * * *